R. OLIVIER
Velocipede.
No. 97,683.
2 Sheets—Sheet 1.
Patented Dec. 7, 1869.
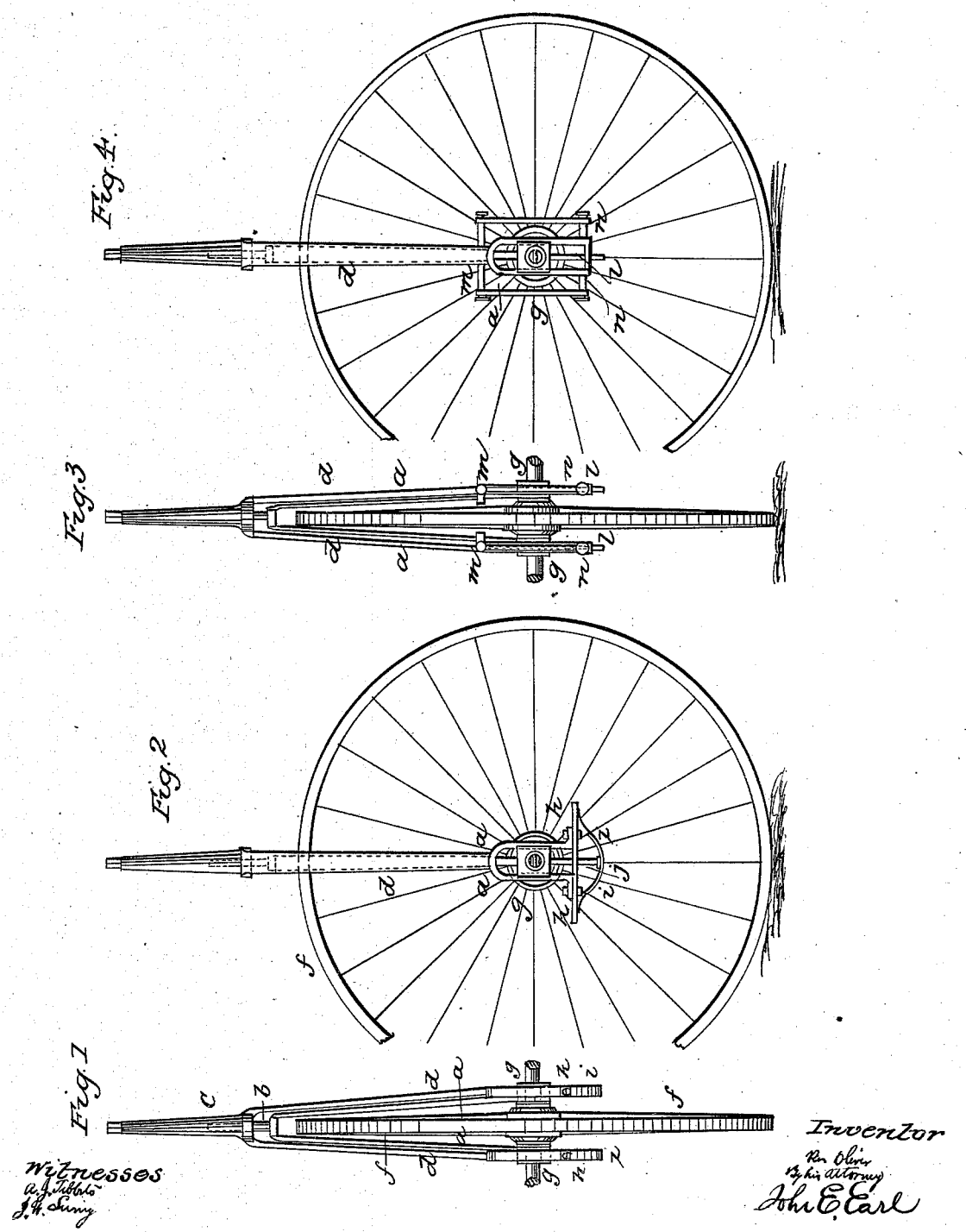

R. OLIVIER
Velocipede.
No. 97,683.
2 Sheets—Sheet 2.
Patented Dec. 7, 1869.
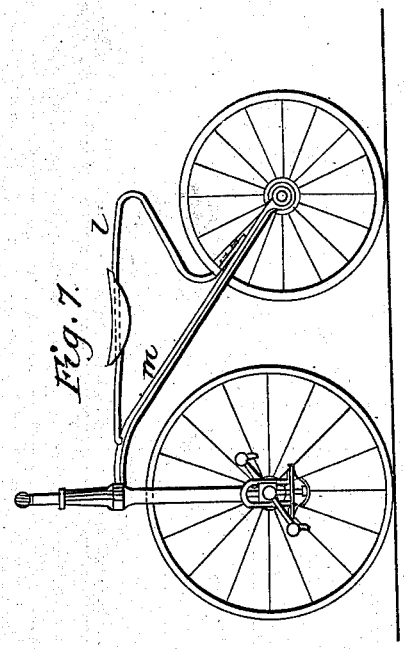
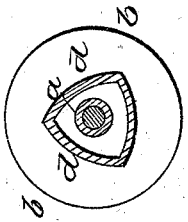
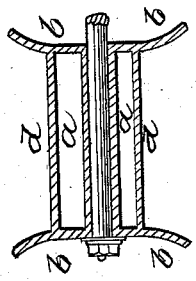
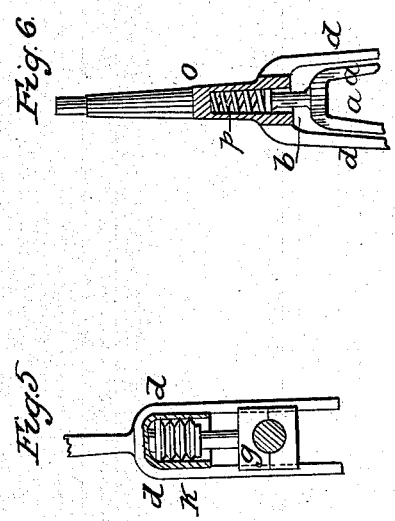
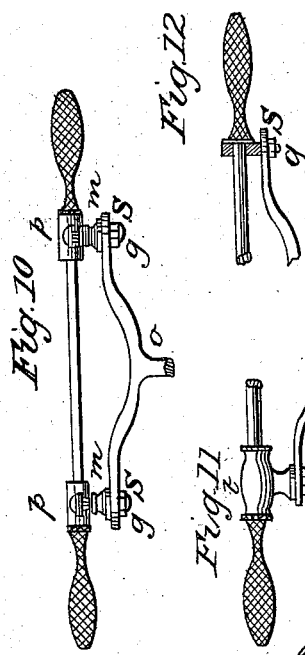
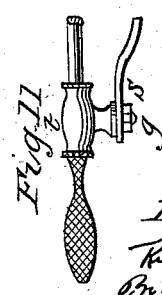
Witnesses
Inventor

United States Patent Office.

RENÉ OLIVIER, OF PARIS, FRANCE.

Letters Patent No. 97,683, dated December 7, 1869.

IMPROVEMENT IN VELOCIPEDES.

The Schedule referred to in these Letters Patent and making part of the same

*To all whom it may concern:*

Be it known that I, RENÉ OLIVIER, of Paris, in the Empire of France, manufacturer, have invented certain new and useful Improvements in the Manufacture and Construction of Velocipedes, and other similar vehicles; and I declare the following to be a full and true description of the same.

Up to the present time, suspension, properly so called, has not existed in the velocipede. The rider only is suspended upon the spring of the saddle, but the apparatus itself is not. This has no doubt arisen from the fact that no sufficiently simple and efficacious arrangement has yet been discovered to effect this object. I believe I have succeeded in overcoming these difficulties.

My improvements are all founded on the same basis, namely, the employment of a compensating auxiliary fork, sliding against and preferably in the interior of the ordinary fork which encloses the driving-wheel.

The two branches of this auxiliary fork are fixed to the bearings in which the shaft of the wheel works, and consolidate their oscillations by perfectly maintaining the equilibrium of suspension.

The first modification is represented in the end view, Figure 1, and in the side view, Figure 2.

The interior and auxiliary fork $a$ is formed with a spindle, $b$, working in a cylindrical socket in the shank $c$ of the main fork $d$.

The two branches $a\ a$ are connected in any suitable manner to the bearings $g\ g$, which support the driving-wheel $f$.

The two extremities of the branches of the ordinary fork $d$ are hollowed out at $u$, to admit the bearings, and they have, at their lower ends, two bars or plates $h\ h$, which act as bearing-surfaces to two flat springs $i\ i$, the centres of which are fixed to the bearings by the two small spindles $j\ j$, passing through two openings in the said bars $h\ h$, and which guide the interior fork in its oscillatory movement.

By means of this arrangement it will be understood that the suspension is in perfect equilibrium, and there is no reason to fear that the lateral displacement of the body of the rider, acting unequally upon the bearings, will incline the axle of the driving-wheel, and cause the said wheel to be pressed against one of the branches of the fork. On the contrary, by this arrangement the bearings are compelled to oscillate in a parallel line, and therefore the vertical movement of the wheel exactly corresponds to the motion of the axis of the fork.

The other modifications that I am about to describe fulfil the same conditions, but by means of rather different arrangements, so far as the construction of the parts is concerned.

In the arrangement represented in the end view, Figure 3, and in the side view, Figure 4, the flat springs are replaced by India-rubber rings, or other elastic material.

The auxiliary interior fork $a$ is still fixed to the bearings $g\ g$, but it is furnished, above them, with two horizontal bars $m\ m$, over which pass the rings, the other ends thereof passing under two similar bars $n\ n$, fixed to the lower part of the principal fork $d$.

Two small spindles $l\ l$, from the bearings, pass through two holes in the bars $n\ n$, and act as guides for preventing any deviation of the interior fork.

The two remaining modifications are very simple. The details only are shown in the drawings.

In the arrangement seen in the side view, Figure 5, the suspension is effected by lenticular or other springs $k\ k$, placed in the recess in the exterior fork $d$, above the bearings $g\ g$, which are attached to the auxiliary fork.

My arrangement is reduced to its most simple form in the modification illustrated in Figure 6.

In this case a single spring produces suspension, this spring $p$ being placed in a socket or cylindrical recess, $o$, in the main pillar, and is compressed by the flanged spindle $b$, which surmounts the auxiliary fork $a$, carrying the bearings as usual, or the spring can be placed between the shoulders of the two forks, if desired.

The bearings, in these various arrangements, may be provided with flanges, for maintaining them exactly in position while they slide in the grooved recesses of the main fork.

In all cases they are solidly fixed to the auxiliary fork, so that this latter balances exactly the actions of the springs and the irregularities caused by the unevenness of motion.

This mode of suspension will also apply to the hind wheel of the velocipede. The auxiliary fork may be dispensed with by utilizing, in a suitable manner, the balancing-fork or double oblique arm of the velocipede for supporting the suspensory springs.

I claim the improvements above described, and especially the following:

For the suspension of the wheels of velocipedes, the combination of an auxiliary compensating-fork.

In testimony whereof, I have signed my name to this specification, before two subscribing witnesses.

R. OLIVIER.

Witnesses:
 F. OLCOTT,
 J. ARMENGAUD.